INVENTORS
Werner Müller
Werner Oehler

3,585,709
METHOD OF MAKING TUBULAR WALLS FROM FINNED PIPES
Werner Müller and Werner Oehler, Gummersbach, Germany, assignors to L. & C. Steinmuller G.m.b.H., Gummersbach, Germany
Filed July 30, 1968, Ser. No. 748,788
Claims priority, application Germany, Aug. 4, 1967, St 27,212
Int. Cl. B23k 31/02
U.S. Cl. 29—472.3          3 Claims

ABSTRACT OF THE DISCLOSURE

A method and apparatus for producing a gas-tight pipe wall according to which lateral pipe means with longitudinally extending oppositely located fins are fed from opposite outer sides of central pipe means provided with longitudinally extending and oppositely located fins so that the respective adjacent fins of said central and lateral pipe means engage each other first at an acute angle and while being pressed against each other are resistance-welded together along respective adjacent fins thereof. The welded together sections of the lateral and central pipe means are, following the welding step advance and subsequent fin sections of the lateral pipe means are moved toward and onto the central pipe means for likewise welding the same together.

---

The present invention relates to the manufacture of a gas-tight tubular wall provided with longitudinal fins, especially for steam producers. A number of methods for producing such tubular walls are known. According to these known methods, either finned pipes or fin-equipped pipes are used for building the wall. The welding together of the individual pipes to make up a tubular wall panel is effected in conformity with the fusion-welding method. The employment of the fusion-welding method for the manufacture of tubular walls is economical when small capacities have to be handled. In view of the ever-increasing size of steam generators, and in view of the demand for tightly welded fire-chambers or fire-boxes, the fusion-welding method can for large capacities be used only when using a multi-head arrangement of automatic welding machines or when employing additional automatic welding machines which, however, would no longer be economical.

It is, therefore, an object of the present invention to provide a method of manufacturing tubular walls from finned pipes or fin-equipped pipes which will overcome the above-mentioned drawbacks.

It is another object of this invention to provide a method as set forth in the preceding paragraph which will permit a fast and easy manufacture of tubular walls from finned or fin-equipped pipes and will meet the requirements nowadays demanded of pipe walls.

Figure 1:
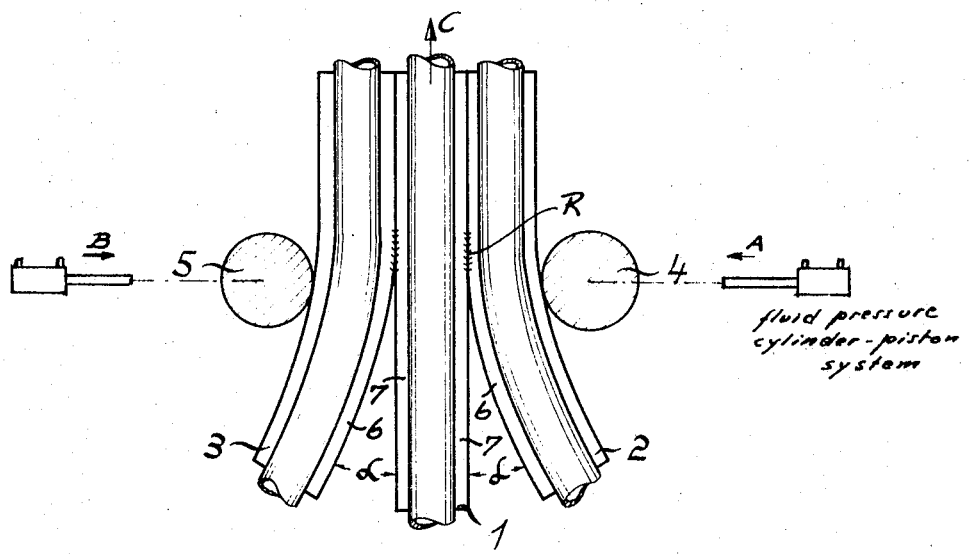
Figure 2:
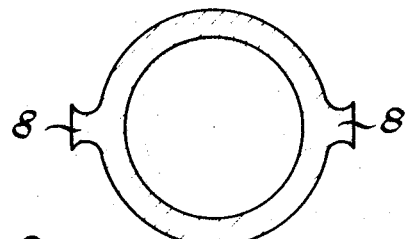
Figure 3:
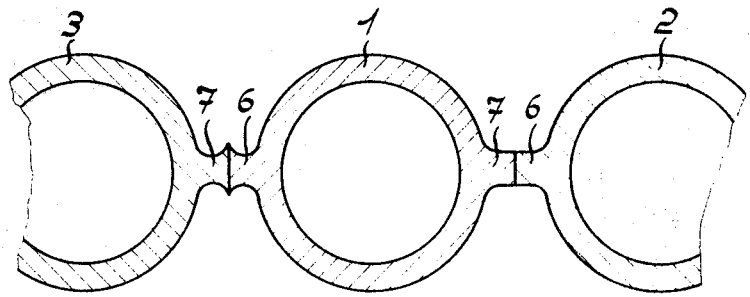

These and other objects and advantages of the invention will appear more clearly from the following specification in connection with the accompanying drawing, in which:

FIG. 1 is a cutaway portion of a finned pipe wall in the first stage of the manufacturing process according to the invention;

FIG. 2 shows a cross-section through a finned pipe as it is used in connection with the manufacture of pipe walls according to the invention; and FIG. 3 represents a cross-section of a portion of a finned pipe wall showing the left two fins in the condition they are in immediately following the welding, while showing the two right-hand fins after a machining of the fins at the welded together section.

Proceeding from one single finned pipe, which represents the central pipe, in a continuous process lateral pipes are from both sides of said central pipe fed toward and onto the central pipe so that the fins of the central pipe are first engaged by the respective adjacent fins of the lateral pipes at an acute angle and are then in the transverse direction of the central pipe pressed by rollers thereagainst while at the same time the mutually engaging fins of said central pipe and lateral pipes are resistance-welded together whereupon the welded together wall portion is advanced for further welding together the next following fin sections. After the two lateral pipes have their inner fins welded to the fins of the central pipe, the procedure is repeated inasmuch as further lateral pipes are fed onto and welded to the previously completed tubular pipe wall portion.

According to a further development of the invention, the pressing rollers are displaceable in the transverse direction of the central pipe, in conformity with the desired width of the tubular wall to be produced.

The manufacture of a finned wall or finned wall section by use of the resistance-welding method brings about the advantage that the resistance-welding equipment already available can be used with greater efficiency. In addition, the use of the resistance-welding method for the manufacture of a finned pipe wall offers the advantage that the corresponding equipment can be used regardless of the pipe dimensions, the distance between adjacent pipe axes, and the spacing between the pipes.

Referring now to the drawing in detail, finned pipes 2, 3 are fed toward and onto a central finned pipe 1 so that the fins 7 extending in longitudinal direction of the pipe 1 are first engaged by the adjacent fins 6 of the lateral pipes 2 and 3 at an acute angle $\alpha$. This angle $\alpha$ must be sufficient to heat up the fin areas which are subsequently subjected to resistance-welding. The resistance-welding area is indicated by the reference letter R.

As will be seen from the drawing, pressing rollers 4, 5 are arranged at approximately the level of the resistance-welding area and are adapted to be pressed in the direction of the arrows A and B to press the pipes 2 and 3 and, more specifically, their inner fins 6, against the respective adjacent fins 7 of the central pipe 1 while providing the fins on the pipe means prior to the welding together of the pipe means with a fin head cross section wider than a fin root cross section adjacent the pipe means.

This procedure is repeated in a continuous operation until the pipes 2 and 3 have their inner fins 6 along substantially their entire length resistance-welded to the fins 7 of the central pipe 1. It will be appreciated that during this operation, the welded together portions of the pipes 1, 2 and 3 are advanced in the direction of the arrow C.

As will also be appreciated from the drawing, especially the left-hand portion of FIG. 3, the abutting pressed and welded together ends of the fins 6, 7 form so-called upsetting beads during the welding operation. Therefore, these beads are, immediately after completion of the welding step, machined-off by any suitable tool so that the welded together bead section will eventually have the shape indicated on the right-hand side of FIG. 3. In order to obtain a notch-free welding joint area, it is advantageous to upset the fins as shown in FIG. 3 so that after the mechanical removal of the upsetting bead, the fins will not be reduced in thickness.

It will furthermore be understood that as soon as a tubular wall section has been built up in the above-outlined manner, this wall section can then be further widened by the feeding of additional lateral pipes to the so far completed wall section, which latter then forms the central pipe section, and the additional lateral pipes are fed toward and onto said central pipe section in a manner analogous to that described above.

In order to accommodate the new lateral pipes, it will, of course, be necessary to move the rollers 4 and 5 further outwardly from the position shown in FIG. 1.

It is, of course, to be understood, that the present invention is, by no means, limited to the particular showing in the drawing, but may also be modified thereover, the scope of the invention being determined by the appended claims.

What we claim is:

1. A method of producing a gas-tight pipe wall composed of central pipe means and lateral pipe means, especially for steam generators, which includes the combination steps of: angularly feeding lateral pipe means with longitudinally extending oppositely located fins from opposite outer sides of central pipe means provided with longitudinally extending and oppositely located fins so that the respective adjacent fins of said central and lateral pipe means engage each other first at an acute angle, and while subjecting said lateral pipe means to a pressure acting in a direction transverse to the longitudinal direction of said central pipe means along a plane passing through the fins thereof progressively resistance-welding together the respective adjacent fins of said lateral and central pipe means, and axially advancing the welded together sections of said lateral and central pipe means while feeding subsequent fin sections of said lateral pipe means progressively toward said central pipe means in advancing direction for resistance-welding said subsequent fin sections to the respective adjacent fin sections of said central pipe means.

2. A method according to claim 1, which includes: the combination steps of providing the fins on the pipe means prior to the welding together of said pipe means with a fin head cross section wider than fin root cross section adjacent the pipe means.

3. A method according to claim 1, which includes: the combination step of subjecting said lateral pipe means to such a pressure in a direction transverse to the longitudinal direction of said central pipe means that the fins engaging each other are fin opposite joinder relation so as to form upset beads progressively, and machining off said beads following the welding operation.

References Cited

UNITED STATES PATENTS

| | | | |
|---|---|---|---|
| 1,844,407 | 2/1932 | Murray | 219—107X |
| 2,381,742 | 8/1945 | Guirl | 219—107X |
| 2,932,844 | 4/1960 | Lyon | 29—481X |
| 2,983,993 | 5/1961 | Johnson | 29—497.5X |
| 3,045,340 | 7/1962 | Kolling | 29—471.1 |
| 3,293,403 | 12/1966 | Rudd | 219—102X |
| 3,319,040 | 5/1967 | Rudd | 219—102 |
| 3,357,083 | 12/1967 | Wiehn et al. | 29—471.1X |
| 3,375,344 | 3/1968 | Kohler et al. | 219—107 |
| 3,420,976 | 1/1969 | Morris et al. | 219—102 |

JOHN F. CAMPBELL, Primary Examiner

R. B. LAZARUS, Assistant Examiner

U.S. Cl. X.R.

29—471.1, 497.5; 219—67, 102, 107